M. M. DOBBIN.
Harrow.
No. 199,421. Patented Jan. 22, 1878.
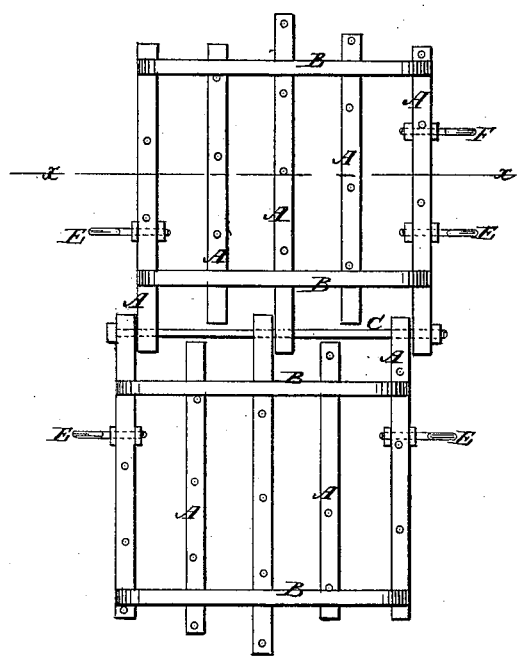
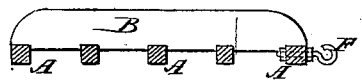
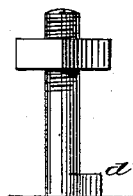
WITNESSES:
Francis McArdle
J. H. Scarborough
INVENTOR:
M. M. Dobbin.
BY Munn & Co
ATTORNEYS.

UNITED STATES PATENT OFFICE

MELVIN M. DOBBIN, OF SUGAR GROVE, ILLINOIS.

IMPROVEMENT IN HARROWS.

Specification forming part of Letters Patent No. 199,421, dated January 22, 1878; application filed November 9, 1877.

*To all whom it may concern:*

Be it known that I, MELVIN M. DOBBIN, of Sugar Grove, in the county of Kane and State of Illinois, have invented a new and useful Improvement in Harrows, of which the following is a specification:

Figure 1 is a top view of my improved harrow. Fig. 2 is a section of the same, taken through the line $x\ x$, Fig. 1. Fig. 3 is a detail side view of one of the teeth. Fig. 4 is a rear view, and Fig. 5 a top view, of the same.

Similar letters of reference indicate corresponding parts.

The object of this invention is to furnish an improved harrow which shall be simple in construction, convenient in use, and effective in operation, doing better work than an ordinary harrow, and which may be readily taken to and from the field, and from one field to another, without being loaded upon a wagon.

The invention will first be described in connection with the drawing, and then pointed out in the claims.

The harrow-frame is made in two sections, each section consisting of five, more or less, parallel cross-bars, A, connected near their ends by two cross-bars, B, attached to their upper sides. The inner ends of the outer and central cross-bars of the two sections project beyond the ends of the other cross-bars, so as to overlap each other and receive the rod or long bolt C, by which the two sections are connected and hinged to each other. The ends of the longitudinal bars B are rounded off, to adapt them to serve as runners when the harrow is turned over for drawing the said harrow from place to place. D are the harrow-teeth, which are made with a sharp wedge-shaped and inclined edge, as shown in Figs. 3 and 5, so that they will cut sods, weeds, stalks, &c., will clear themselves of rubbish, and will pass through the ground more easily, and will enter the ground to a greater depth, than the ordinary square teeth. The rear edges of the teeth are made straight and with their corners beveled, as shown in Figs. 3, 4, and 5. The shanks of the teeth D are made round, and with a screw-thread upon their upper ends, so that they may be passed through holes in the bars A, and may be secured in place by nuts screwed upon said upper ends. Upon the upper ends of the teeth D, at the base of the shank, are formed projections $d'$, to enter recesses in the bars A, and prevent the said teeth from turning. To the front and rear bars A are attached two hooks, E, for the attachment of the draft, so that the harrow may be drawn with the inclined or the straight edges of the teeth D forward, as may be desired. To one of the outer bars A is attached another hook, F, so that when the harrow has been turned over for being drawn from place to place the two sections may be folded together, and the draft applied to the lower section.

Having thus described my invention, I claim as new and desire to secure by Letters Patent—

1. A harrow in which the tooth-bars of each section are arranged transversely, and connected by longitudinal bars that also form runners, as shown and described.

2. A harrow-tooth drawn to an acute angle on one edge and to an obtuse angle on the opposite edge, the former edge being rearwardly sloped and the other perpendicular, for the purpose specified.

MELVIN M. DOBBIN.

Witnesses:
ANNA M. DOBBIN,
JOEL VOLINTINE.